United States Patent [19]
Carbonneau

[11] 3,965,377
[45] June 22, 1976

[54] LINEAR FORCE GENERATOR

[75] Inventor: Gordon S. Carbonneau, Grand Rapids, Mich.

[73] Assignee: Carbonneau Industries, Inc., Grand Rapids, Mich.

[22] Filed: June 21, 1973

[21] Appl. No.: 372,335

[52] U.S. Cl. ................................................ 310/14
[51] Int. Cl.² ........................................ H02K 41/00
[58] Field of Search .................. 310/12, 13, 14, 15, 310/16, 27; 318/128; 335/252, 253, 254, 263, 264, 256; 331/116 M

[56] References Cited
UNITED STATES PATENTS

| | | | |
|---|---|---|---|
| 2,619,116 | 11/1952 | Ralston | 335/256 |
| 2,764,019 | 9/1956 | Lindholm et al. | 310/27 X |
| 2,989,666 | 6/1961 | Brenner et al. | 310/12 X |
| 3,139,545 | 6/1964 | Dreyfus | 310/27 |
| 3,156,837 | 11/1964 | Weller et al. | 310/16 X |
| 3,206,609 | 9/1965 | Dawes | 310/15 |
| 3,487,241 | 12/1969 | Carter | 310/13 |
| 3,668,487 | 6/1972 | Cuzner et al. | 310/27 |
| 3,671,829 | 6/1972 | Mathews | 310/27 X |
| 3,729,691 | 4/1973 | Beiswinger et al. | 318/128 X |
| 3,753,384 | 8/1973 | Anfindsen | 310/14 X |

*Primary Examiner*—J D Miller
*Assistant Examiner*—Patrick R. Salce
*Attorney, Agent, or Firm*—Austin A. Webb

[57] ABSTRACT

A valve pin is positioned to open and close a bleed port from the suction side of a carburetor to the exterior of the carburetor in response to variations in electrical control current. Control current is alternatively derived from sensing sources responsive to engine speed or temperature of the engine or engine exhaust. The valve element is connected to and actuated by a magnetic coil operating within the field of a permanent magnet and against a spring bias force to produce valve movement which is directly proportional to changes in the control current throughout the movement of the valve.

19 Claims, 7 Drawing Figures

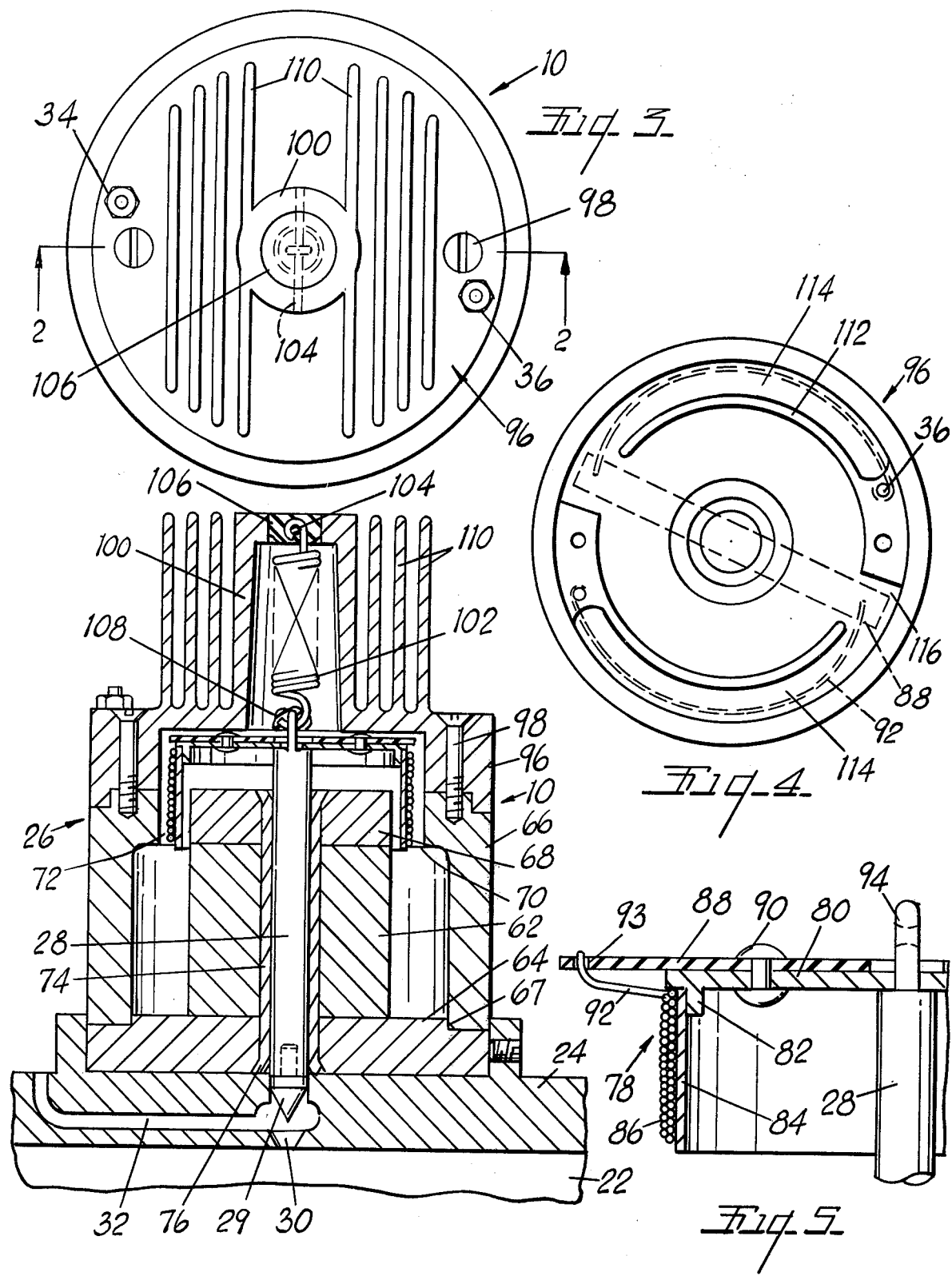

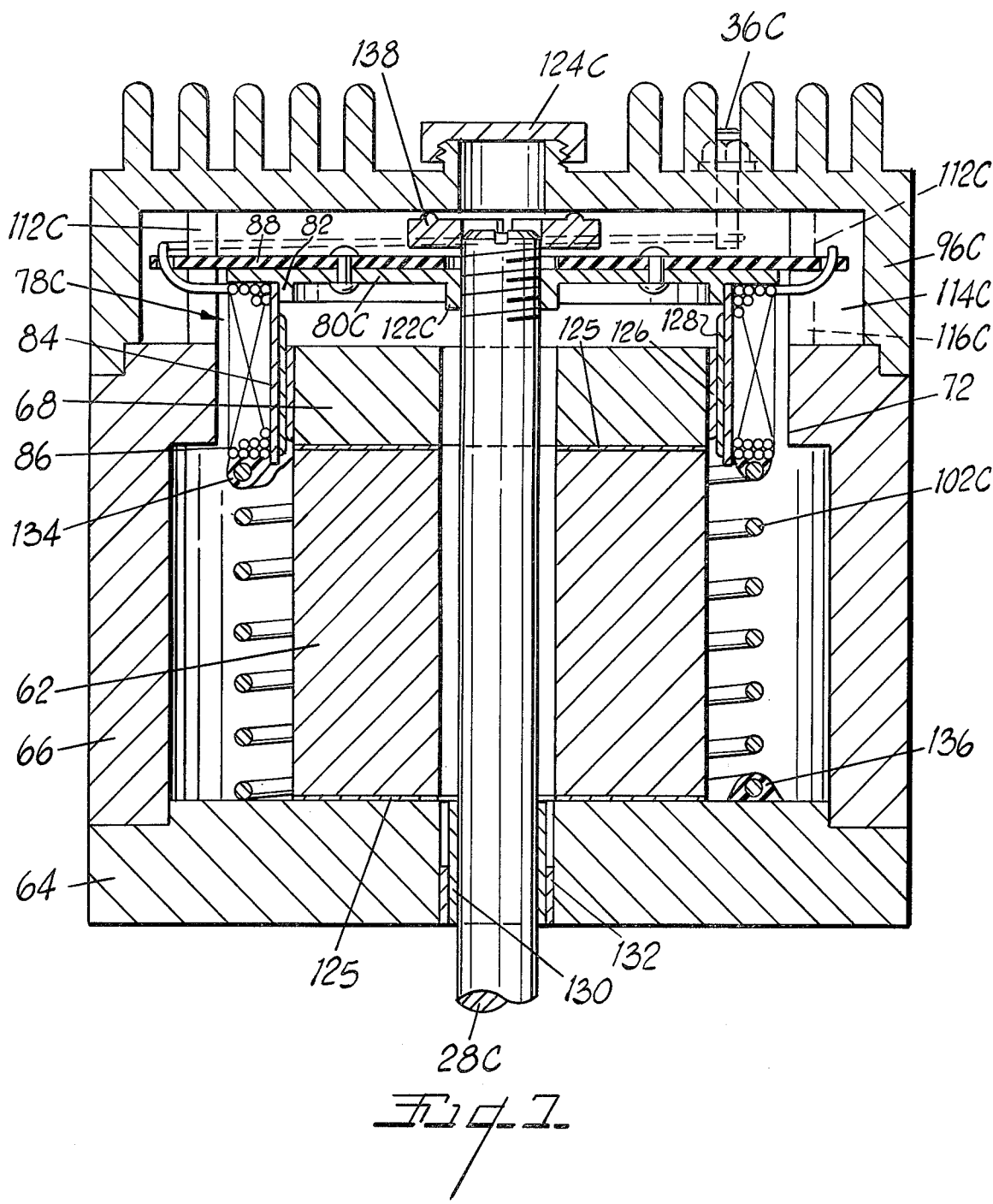

LINEAR FORCE GENERATOR

OUTLINE OF INVENTION

Magnetically driven linear force devices utilizing a coil movable axially in a magnetic field created by a permanent magnet are old as in U.S. Pat. No. 3,487,241 to Carter and Pat. No. 3,694,678 to Scarrott. These actuators rely upon the use of opposite polarity currents to control and determine the axially displaced positions of the coils and the parts driven thereby. The present invention provides not only a lightweight and easily axially movable coil, but also a biasing or return spring which returns the coil to a retracted position in the absence of any current through the coil. Within limits, movement of the coil is directly proportional to the magnitude of the applied current, and operation is stable under vibration and varying temperatures.

The structural relationship of the parts of the generator provide for maximum efficiency of the magnetic circuit, as well as minimum error in operation due to friction. It also provides protection and enclosure for the close clearance between the coil and the magentic parts.

It is an incidental structural feature of the generator that the bearing acts as a retainer for connecting the magnet with the magnetic return parts. The shaft can be part of a valve or connected to a separate control element. A housing coaxial with the shaft and coil may be formed in part by the magnetic return parts and encloses a biasing spring connected to the shaft, and is arranged to dissipate heat from the coil. The spring may be compressed or tensioned by energization of the coil and may be located at either end of the magnet or in concentric relation around the magnet. Another incidental structural detail of one form of the generator is that the spring acts as a very low friction anti-rotation control for the shaft.

While numerous details of the generator are incorporated to assist in reduction of size and weight of the generator, the essential features of the generator may be incorporated in larger linear force generators.

DESCRIPTION

The drawings, of which there are four sheets, illustrate a preferred form of the invention, and two modified forms thereof.

FIG. 2 is an enlarged cross sectional view taken along the plane of the line 2–2 in FIG. 1, and in FIG. 3.

FIG. 3 is a plan or outside end view of the generator.

FIG. 4 is an inside elevational or bottom plan view of the cap of the generator.

FIG. 5 is a fragmentary, further enlarged, cross sectional view of the mounting of the coil support on the valve actuating pin.

FIG. 7 is a cross sectional view through a second modified form of generator.

Figure 1:
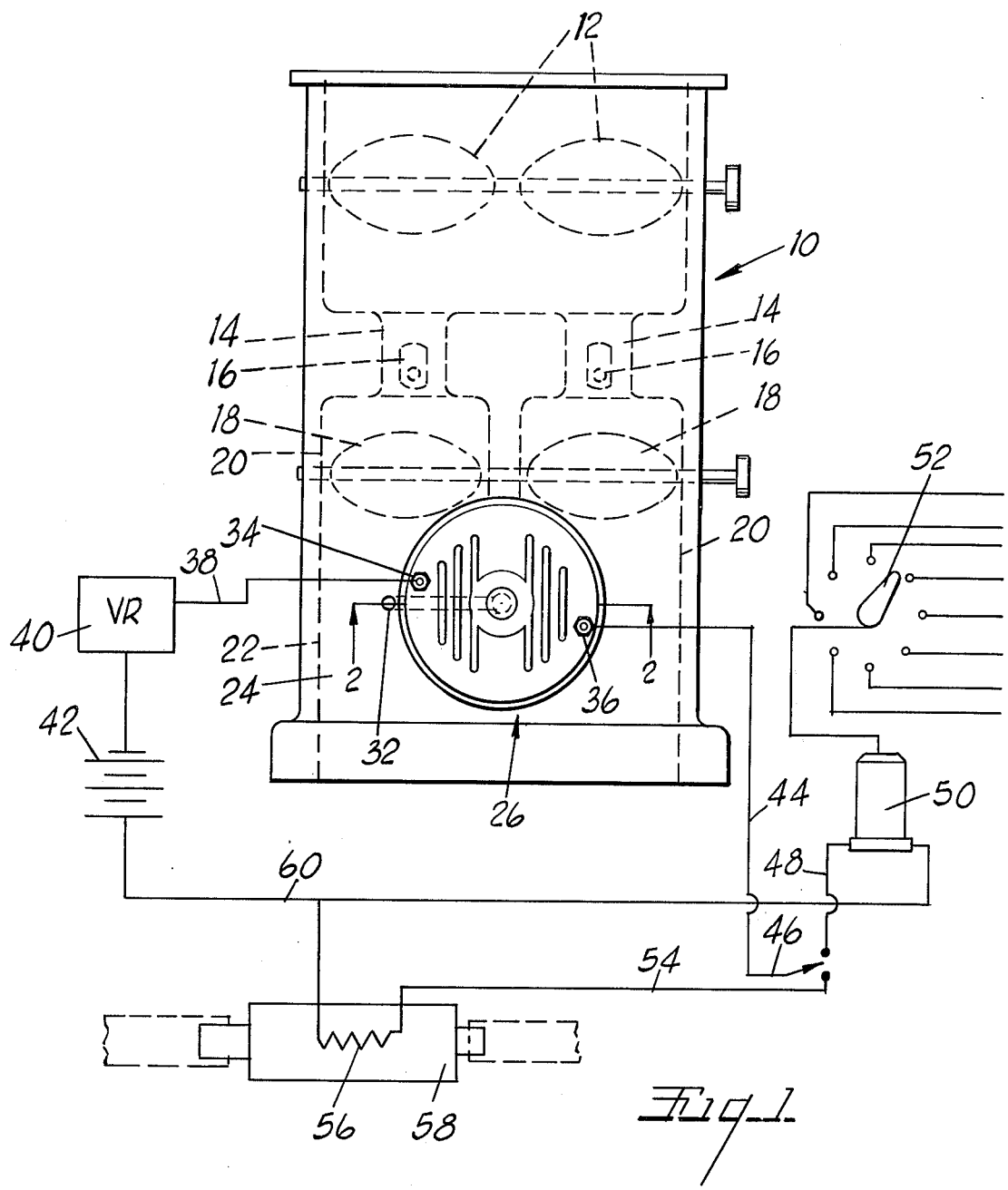
FIG. 1 is a composite elevational and schematic view showing the force generator attached to a carburetor and connected for actuation from the ignition system or a temperature responsive sensor associated with the engine on which the carburetor is mounted.

FIG. 1 conventionally iillustrates a carburetor 10 having dual choke valves 12 operating over two throats 14 and nozzles 16, with dual throttle valves 18 operating in separate barrels 20 over a vacuum feed chamber 22. No attempt is made to illustrate the details of the carburetor as they can vary widely. Mounted on the side wall 24 of the suction chamber is the force generator 26 of the invention. As appears more clearly in FIG. 2, the generator reciprocates a shaft 28 as a valve actuating element to open and close a port 30 in the side wall 24 to the vacuum chamber 22. The port 30 opens through passage 32 to the exterior of the carburetor to break or reduce the vacuum applied to the throats. Again, the arrangement of ports and venting of the carburetor inlet to the engine may be varied as conditions dictate. The needle valve portion 29 may be a separable part of the shaft 28. The shaft may also be connected to other control elements in alternative applications of the generator.

The generator has two external terminals 34 and 36. FIG. 1 conventionally illustrates two alternative ways of actuating the generator. Wire 38 extends to a voltage regulator 40 and a battery 42 while wire 44 extends to switch 46 which can be selectively closed on wire 48 connected to the distributor coil 50 and distributor 52 of the engine. Alternatively the switch 46 may be closed on wire 54 which extends through a heat sensitive resistor 56 located where it will be responsive to engine temperature as by being located in the muffler 58. The wire then connects to the battery wire 60.

The force generator 26 includes a permanent magnet 62 in the form of a cylinder which is magnetized from end to end. The cylinder is surrounded by a metallic magnetic return path consisting of a base plate 64, a cylindrical case 66 and a pole tip 68 on the upper end of the magnet. All of these parts are of soft iron or steel. The cylindrical case 66 is press fitted around an upstanding shoulder 67 on the base; but could be machined as part of the base. The case has an inturned lip or flange 70 at its outer end which is in opposed spaced relation to the side of the pole tip disc 68 and which forms the outer side or pole face of a narrow cylindrical coil opening 72. The construction is similar to that used in the magnet structure of loudspeakers, and functions to concentrate the magnetic lines of force developed by the permanent magnet across the coil opening.

The magnet 62, base plate 64 and pole tip 68 have aligned central holes within which a bearing tube 74 is pressed. The ends of the tube are flared as at 76 and act to hold the parts together, while the tube itself acts as a bearing and guide for the shaft 28.

The coil assembly 78 carried on the upper end of the shaft 28 consists of a lightweight aluminum disc 80 having a depending flange 82 near its outer edge. A cylindrical coil form 84 of thin sheet material, preferably aluminum, is glued around the flange and supports an electrical coil 86 of fine wire for reciprocal movement in the coil opening 72. The coil 86 is preferably made up of several layers of superimposed windings and is mechanically self-supporting when assembled. A cross bar 88 of insulating material is secured across the top of the disc 80 as by rivets 90 and acts as a support for the end leads 92 of the coil, and as an anti-rotation stop for the coil and disc as will be described. The upper end of the shaft 28 is shouldered to support the disc and has a tongue 94 projecting upwardly through the disc and the cross bar.

Secured over the upper end of the magnet assembly and the coil assembly is a cover 96. The cover is desirably molded and is secured by screws 98. It may be of plastic or anodized aluminum when greater heat radiation is desired. It is chambered on the underside to provide space for the coil assembly, and has an upstanding hollow column 100 which houses a tension spring 102. The upper end of the spring hooks over a pin 104 passed through the walls of the column, while the lower end of the spring is hooked through a hole in the tongue 94 on the shaft. A plug 106 of plastic rubber-like material seals the upper end of the column 100 and prevents the spring from vibrating on the pin 104. A similar mass 108 of rubbery adhesive may anchor the lower end of the spring to the tongue 94. Silicone rubber is ideal for the plug 106 and mass 108. Desirably, the top or end of the cover is molded with heat dissipating ribs 110.

The underside of the cover shown more clearly in FIG. 4 is formed with two arcuate ribs 112 at the inner edge of two arcuate slots 114. Radial slots 116 open outwardly to the slots 114 from the recessed underside of the cover. These receive the ends of the cross bar 88 and prevent the coil assembly 78 and value shaft 28 from rotating. The end leads 92 of the coil are guided in the slots 116 and 114 to the ends of terminal screws 34–36 extending through the top of the cover. The lead wires are conveniently threaded through holes 93 in the ends of the cross bar so that they move freely in the arcuate slots 114.

Figure 6:
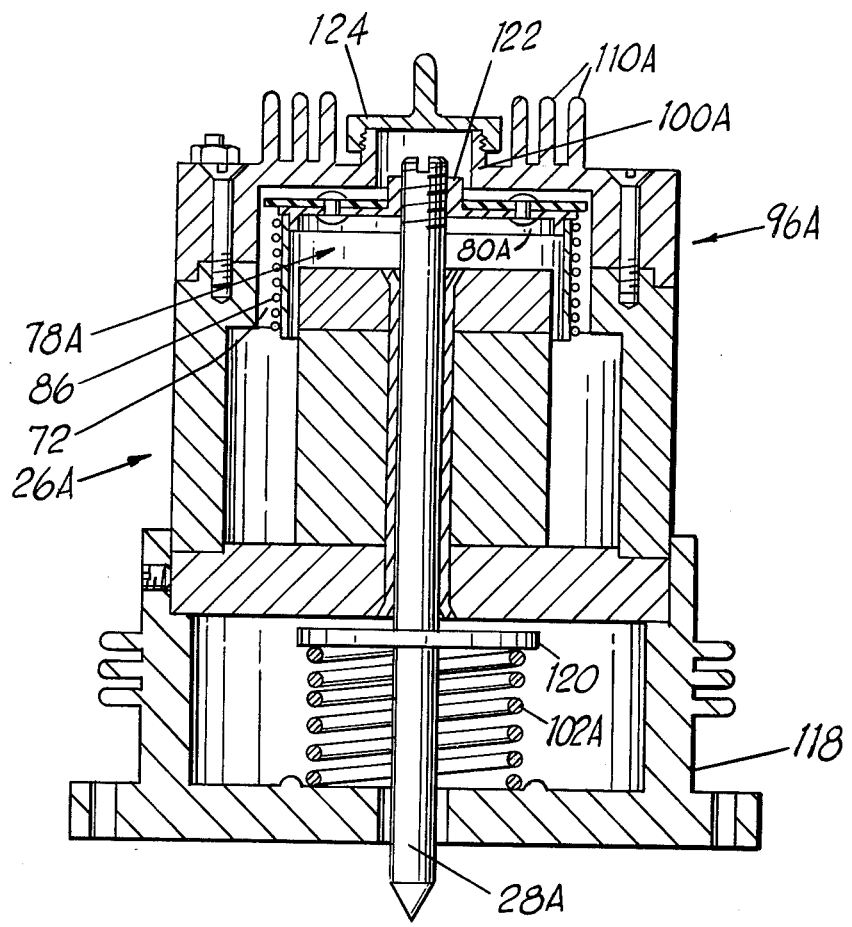
FIG. 6 is an axial cross sectional view through a modified form of the generator.

The modified force generator 26A shown in FIG. 6 substitutes a compression spring 102A for the tension spring in the first form of the generator. A base housing 118 is adapted to be secured to the carburetor and receives the spring in surrounding relation to the end of the valve shaft 28A. A shoulder or flange 120 on the shaft abuts the upper end of the spring. The magnet assembly 26A is essentially the same as in the first form as is the coil assembly 78A except that the coil support disc 80A has a central threaded neck 122 which is adjustable on the threaded upper end of the valve shaft 28A.

The cover 96A has a shortened and externally threaded column 100A that receives a screw cap 124. The heat dissipating flanges 110A are shortened.

In both forms of the generator the retracted (upward) limit of movement of th coil 86 is determined, by engagement of the rivets 90 with the inside of the cover 96 or 96A so that the lower leading end of the coil is within the upper end of the magnetic field in the gap 72. At the same time the spring 102 and 102A is slightly loaded. This is determined by locating the pin 104 in FIG. 2 or the collar 120 in FIG. 6 relatively to the lengths of the spring 102 and 102A to apply a slight tension to spring 102 and a slight compression to spring 102A. The valve actuating pins or needle valves 28 and 28A are thus biased to retracted or open positions.

FIG. 7 shows a further modified form of the generator. The magnet 62, base plate 64, case 66 and pole tip 68 are essentially the same as in the prior forms. The coil assembly 78C is shown in somewhat exaggerated detail. The coil carrying disc 80C has a downturned and internally threaded neck 122C engaged on the threaded upper end of the shaft 28C. The coil 86 and the coil form tube 84 are the same, as is the insulating cross bar 88. However, the pole tip, magnet, and base plate are held together by magnetic attraction and thin layers of adhesive 125. The shaft 28C clears the surfaces of the pole tip, magnet and base plate due to the elimination of the bearing tube 74.

The bearing fit and alignment of the parts is provided at the upper end of the shaft by two anti-friction coatings of tetra fluro ethane. A first coating 126 is applied around the outer face of the pole tip, and a coacting coating 128 is applied to the inside of the coil form or tube 84. At the bottom of the shaft a coating 130 is applied around the shaft to coact with an opposed coating 132 around the inside of the bore in the base plate 64. The spring 102C which retracts ths shaft is housed around the magnet and within the housing 66. At its upper end the spring abuts the bottom of the coil 86. In order to hold the ends of the spring and coil in registry, an arcuate segmental band or strip 134 of plastic silicone rubber adhesive is applied to the bottom of the coil and around the top turn of the spring. Another strip or spot 136 of the adhesive locates the bottom of the spring against the base plate. It will be noted that by thus holding the ends of the spring, the coil 86 and the insulating cross bar 88 are prevented from rotating. A practically friction free anti-rotation connection is thus provided. The ends of the cross bar still project into the cross slots 116C and the arcuate slots 114C in the bottom of the cover 96C, and guide the ends of the coil to the terminals of the generator. The cover is finned and has a central threaded cap 124C over a center hole through which acess may be had to the slotted upper end of the shaft for adjustment in the neck of the coil support disc. An upper limit stop disc 138 may also be provided on the end of the shaft and accessible through the cover opening to adjust the retracted position of the shaft independently of the position of the coil. This permits precise adjustment of the position of the coil relative to the magnetic field of the magnet, as well as the initial compression load on the spring.

All three forms of the generator incorporate enclosed springs and enclosed bearings for the actuating shaft of the generator. This is desirable as the clearance between the coil and the magnetic face 72 is kept as small as possible, and entry of dust or foreign matter into the gap would have a detrimental affect on the accuracy of the generator. However, if the generator is to operate in a dust free environment, the cover could be eliminated and external bearings and support for the coil support disc 80 could be provided. Such a change would eliminate the need of passing the actuating shaft through the center of the magnet, and also omit the central bore in the magnet parts. An external cage (not illustrated) could support the coil disc and the actuating part relative to the magnet.

The strength of the magnetic field created by the magnets 62 and the coacting actuating force of the coils 86 is carefully coordinated to produce a uniformly increasing attraction or pull on the coils as the current supplied to the coils varies in the critical range of opeation of the engine to be controlled or to be responsive to. When switch 46 is closed on the distributor 50, the coils will be energized by a variable series of rapid pulses which act as an increasing current as the speed increases. Opening of the needle valve 28–30 can thus be calibrated to vent air to the intake of the engine and limit speed to a predetermined maximum, without reducing the power of the engine below the critical speed. When connected for actuation through the heat variable resistor 56 the valve may be arranged to vent the carburetor or to otherwise adjust the mixture admitted to the engine or any part of the exhaust system in response to temperature of operation, or more precisely the temperature of the exhaust gases.

In order to keep the force generator small and inexpensive without loss of reliable operation and without detrimental effect by heat encountered during operation, it is necessary to carefully balance the size and operating characteristics of the parts of the generator. While changes can obviously be made in the characteristics of one element by compensating changes in another element, the following specific examples of a desirable system are given.

The permanent magnet 62 is 0.772 inches long and 0.995 inches in diameter with a central bore of about 0.25 inches diameter. This size in an Alnico magnet give a weight of 60 to 70 gr., and when combined with the other factors of the generator parts creates a pull of about one pound on the coil when the valve actuating shaft is extended one-eighth of an inch from the lightly loaded retracted stop position of the coil and shaft. The strength of the coil spring is of course designed to create a like reaction force at the same deflection. An increase in the diameter of the magnet to 1.25 inches with a corrrespounding increase in length would increase the pull to about two pounds.

The magnetic return path formed by the base 64, case 66 and pole tip 68 is balanced to the available magnetic force in the magnet. All of these parts are made of magnetically conductive soft iron or steel. The base is about 0.250 inches thick, and it and the case are aBOUT 1.60 inches outside diameter. The wall thickness of the case is about 0.165 inches. The inwardly projecting flange 70 is about 0.25 inches in axial length and the inward projection is about 0.093 inches. This leaves or creates a cylindrical pole face 72 about 1.08 inches in diameter and about 0.25 inches in length. The opposd pole face formed by the pole tip 68 is about 1 inch or slightly over in diameter and about 0.25 inches in length. This creates a pole face of about 0.785 square inches which opposes the pole face on the case flange at a radial spacing of about 0.036 inches, within which the coil 86 and coil form tube 84 reciprocate freely without touching either pole face. This magnetic circuit produces a flux density of between 5500 and 6500 gauss per square centimeter. The use of the tubular guide 74 and its swagged ends 76 to hold the parts of the magnet together increases the magnetic conductivity and efficiency of the magnet by maintaining close conducting magnetic contact between the connected parts.

The electrical coil 86 is actually four layers of varnished fine copper wire and is about 0.40 inches long. It has a resistance of about 23.5 ohms. The resistance of course increases slightly with temperature, which is the reason for providing maximum heat dissipation through the metallic foil core form 84, coil disc 80 and valve actuating stem 28, and through the heat dissipating fins 110. When the voltage regulator is set to supply a maximum voltage of about 12 volts, the coil will draw a current of about 500 milliamperes or half an ampere of current at the maximum deflection of the coil and the valve operating shaft. In the Off or no current position shown, the lower end of the coil is about even with the lower end of the magnetic gap.

By way of explanation, it is pointed out that increasing the size of the magnet without corresponding increase in the size of the magnet return path merely overloads the magnetic capacity of the return path and is wasteful of the magnet capabilities. Increasing the length of the coil increases its resistance and thus increases the IR drop and operating temperature of the coil and thus is inadvisable.

It has further been proven in the art of permanent magnet loudspeakers that the optimum proportions of a permanent magnet as to length diameter and volume are essentially as shown and described.

It will be apparent that if the generator is to be used to drive or actuate a part which is itself spring or otherwise biased in one direction, then the spring of the force generator may be omitted, relying on the connection between the coil support and the part to be regulated to return the coil to the desired starting or neutral position.

The essential relationships and parts of the generator are defined in the following claims.

What is claimed as new is:

1. A linear force generator for use in regulating an internal combustion engine comprising,
   a magnetic generator including a permanent magnet housed in a surrounding case and having a magnetically conductive tip located in opposed spaced relation to an annular pole face on the open end of the case,
   said case, magnet and pole tip defining a central bore,
   bearing means located in the ends of said bore,
   an actuating pin extending through said bearing means and adapted at one end for regulating a function of said engine,
   a coil carrying disc mechanically connected to said pin in axially spaced relation over said pole face,
   a coil carried by the periphery of said disc and projectting in spaced relation into the gap between said pole tip and said pole face,
   a cover secured over the open end of said case and enclosing said disc in axially spaced relation to said pole tip,
   coil spring means arranged to bias said pin and said coil to a retracted position of said coil outwardly from said pole tip and pole face,
   electrical terminal connections carried exteriorly on said cover,
   lead wires on the ends of said coil extending in freely self-supporting and movable relation from said coil to said terminal connections with portions of the wires transverse and askew to the end of said coil,
   and stop means coacting between said pin and said case to limit the retracting motion of the pin and coil,
   said spring means and the magnetic attraction of said coil relative to said magnet constituting the sole moving force elements acting on said coil.

2. A force generator as defined in claim 1 in which said magnet and the magnetic return path formed by said case and said pole tip are sized to produce maximum flux density in the gap between said pole tip and said pole face,
   said coil being between 55 and 65% longer than the length of the field between said pole tip and pole face,
   and said stop means being arranged to stop said coil with one end projecting through the field to about even with the end of the gap between said pole tip and said pole face.

3. A force generator as defined in claim 1 in which said magnet has a length of between 0.65 and 0.75 times its diameter, the bore through said magnet having a diameter approximately equal to one quarter the diameter of the magnet.

4. A linear force generator comprising, a cylindrical permanent magnet having a central bore formed therethrough, a magnetically conductive pole tip on one end of said magnet and having a central hole aligned with said bore, a magnetically conductive case surrounding said magnet in spaced relation thereto and having a bottom wall engaging the opposite end of said magnet from said pole tip, said bottom wall having a central hole aligned with said bore, said case having an annular pole face on the outer end thereof in radially spaced relation to the side of said pole tip, a force transmitting pin projecting axially through said bore and said central holes and therebeyond, bearing means slidably locating said pin centrally of said bore, a coil support disc connected to said pin in axially opposed relation to said pole tip, an electrical coil mechanically supported around the periphery of said disc and sized to move freely into the gap between said pole tip and said pole face, a cover closing the open end of said case and in enclosing relation to said disc and said coil, flexible lead wires extending from said coil to terminals located exteriorly of said case and cover, and spring means biasing said pin and said coil to a retracted position away from said magnet and into abuting relation between said cover and said disc, said spring means and the magnetic attraction of said coil relative to said magnet constituting the sole moving force elements acting on said coil.

5. A force generator as defined in claim 4 in which said cover has an inwardly facing central recess, and said spring means is a coiled tension spring anchored between the outer end of said recess and the outer end of said pin.

6. A force generator as defined in claim 4 in which said spring means is a coiled compression spring located around said pin exteriorly of said case and cover and bearing against a collar on said pin, and an outer abutment for said spring connected to the bottom of said case.

7. A linear force generator for use in regulating an internal combustion engine comprising, a magnetic generator including a permanent magnet housed in a surrounding case and having a magnetically conductive tip located in opposed spaced relation to an annular pole face on the open end of the case, said case, magnet and pole tip defining a central bore, bearing means located in the ends of said bore, an actuating pin extending through said bearing means and adapted at one end for regulating a function of said engine, a coil carrying disc mechanically connected to said pin in axially spaced relation over said pole face, a coil carried by the periphery of said disc and projecting in spaced relation into the gap between said pole tip and said pole face, a cover secured over the open end of said case and enclosing said disc in axially spaced relation to said pole tip, a helical tension spring connected at one end to said cover and at the other end to the outer end of said pin to bias said pin and said coil to a retracted position of said coil outwardly from said pole tip and pole face, electrical terminal connections carried exteriorly on said cover, lead wires on the ends of said coil extending in freely self-supporting and movable relation from said coil to said terminal connections with portions of the wires transverse and askew to the end of said coil, and stop means coacting beteen said pin and said case to limit the retracting motion of the pin and coil, said spring means and the magnetic attraction of said coil relative to said magnet constituting the sole moving force elements acting on said coil.

8. A force generator as defined in claim 7 in which said cover has a hollow column surrounding said spring, and a pin passed transversely through said column and serving as the outer anchor for said spring.

9. A force generator as defined in claim 7 in which said column has an opening in its outer end, said opening being sealed by a mass of plastic material pressed thereinto and in surrounding relation to said pin and the outer end of said spring.

10. A force generator as defined in claim 7 in which said stop means consist of an insulating cross bar secured to said disc and projecting beyond the periphery of said pole face, said cross bar being engageable with the inside of said cover, radial notches formed in the underside of said cover and nonrotatably receiving the ends of said cross bar, and arcuate channels formed in said cover between said radial notches and said terminal pins, said lead wires being guided to said arcuate channels and said pins along said cross bar.

11. A force generator as defined in claim 10 in which said cover is formed of heat conductive metallic material and has heat dissipating ribs formed on its outside.

12. A force generator as defined in claim 7 in which said cover is formed of heat conductive metallic material and has heat dissipating ribs on the exterior thereof.

13. A force generator as defined in claim 7 in which said coil carrying disc is formed of heat conducting metallic material and is in heat transfer relation to said coil.

14. A force generator as defined in claim 7 in which said bearing means is a tube extending through said pole tip, said magnet, and the bottom of said case and having outwardly flared ends retaining the parts together.

15. A liniar force generator for use in regulating an internal combustion engine comprising:

a magnetic generator including a permanent magnet housed in a surrounding case and having a magnetically conductive tip located in opposed spaced relation to an annular pole face on the open end of the case, said case, magnet and pole tip defining a central bore, bearing means located in the ends of said bore, an actuating pin extending through said bearing means and adapted at one end for regulating a function of said engine, said pin having a spring abutment shoulder located exteriorly of said case and said magnet, a base secured to said case in spaced relation to said shoulder, a coiled compression spring engaged between said shoulder and said base, a coil carrying disc mechanically connected to said pin in axially spaced relation over said pole face, an electrical coil carried by the periphery of said disc and projecting in spaced relation into the gap between said pole tip and said pole face, a cover secured over the open end of said case and enclosing said disc in axially spaced relation to said pole tip, said spring biasing said disc and electrical coil toward said cover, electrical terminal connections carried exteriorly on said cover, lead wires on the ends of said electrical coil extending in freely self-supporting and movable relation to said coil to said terminal connections with portions of the wires transverse and askew to the end of the coil.

and stop means coacting between said pin and said cover to limit the retracting motion of said pin and coil, said spring and the magnetic attraction of said coil relative to said magnet constituting the sole moving force elements acting on said coil, said pin having an axially adjustable threaded connection at its inner end to said coil carrying disc, said cover having an opening exposing said adjustable connection.

16. A force generator as defined in claim 15 in which said pin has a needle valve on its outer end forming the engine regulating part thereof.

17. A force generator as defined in claim 15 in which the inner end of said pin has an axially adjustable threaded connection to said coil carrying disc, said cover having a central opening exposing said adjustable connection.

18. A force generator as defined in claim 15 in which there is a removable closure for the central opening in said cover.

19. A linear force generator for use in regulating an internal combustion engine comprising, a magnetic generator including a permanent magnet housed in a surrounding case and having a magnetically conductive tip located in opposed spaced relation to an annular pole face on the open end of the case, said case, magnet and pole tip defining a central bore, bearing means located in the ends of said bore, an actuating pin extending through said bearing means and adapted at one end for regulating a function of said engine, a coil carrying disc of metal mechanically connected in heat conductive relation to said pin in axially spaced relation over said pole face, a coil wound on a metal foil form carried by the periphery of said disc in heat conductive relation to the disc and projecting in spaced relation into the gap between said pole tip and said pole face, a cover secured over the open end of said case and enclosing said disc in axially spaced relation to said pole tip, coil spring means arranged to bias said pin and said coil to a retracted position of said coil outwardly from said pole tip and pole face, electrical terminal connections carried exteriorly on said cover, lead wires on the ends of said coil extending in freely self-supporting and movable relation from said coil to said terminal connections with portions of the wires transverse and askew to the end of said coil, and stop means coacting between said pin and said case to limit the retracting motion of the pine and coil, said spring means and the magnetic attraction of said coil relative to said magnet constituting the sole moving force elements acting on said coil.

* * * * *